United States Patent
Tan et al.

(10) Patent No.: US 10,372,743 B2
(45) Date of Patent: Aug. 6, 2019

(54) SYSTEMS AND METHODS FOR HOMOGENEOUS ENTITY GROUPING

(71) Applicant: Baidu USA, LLC, Sunnyvale, CA (US)

(72) Inventors: Shulong Tan, Santa Clara, CA (US); Hongliang Fei, Sunnyvale, CA (US); Yi Zhen, San Jose, CA (US); Yu Cao, Santa Clara, CA (US); Bocong Liu, Sunnyvale, CA (US); Chaochun Liu, San Jose, CA (US); Richard Chun Ching Wang, Mountain View, CA (US); Dawen Zhou, Fremont, CA (US); Wei Fan, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 299 days.

(21) Appl. No.: 15/215,492

(22) Filed: Jul. 20, 2016

(65) Prior Publication Data
US 2018/0025008 A1    Jan. 25, 2018

(51) Int. Cl.
*G06F 17/30* (2006.01)
*G06F 16/35* (2019.01)
*G06F 16/33* (2019.01)

(52) U.S. Cl.
CPC ........ *G06F 16/355* (2019.01); *G06F 16/3331* (2019.01)

(58) Field of Classification Search
CPC ........... G06F 17/30657; G06F 17/3071; G06F 16/3331; G06F 16/355
USPC ...................................... 703/2, 10; 707/737
See application file for complete search history.

(56) References Cited

U.S. PATENT DOCUMENTS

| | | | |
|---|---|---|---|
| 9,535,902 B1* | 1/2017 | Michalak | G06F 17/271 |
| 2007/0233656 A1* | 10/2007 | Bunescu | G06F 17/278 |
| 2008/0104063 A1* | 5/2008 | Gallivan | G06F 17/30616 |
| 2010/0293195 A1* | 11/2010 | Houghton | G06F 17/241 |
| | | | 707/776 |
| 2011/0004618 A1* | 1/2011 | Chaudhary | G06F 17/30657 |
| | | | 707/769 |

(Continued)

OTHER PUBLICATIONS

Sondhi, "Feature Construction Methods: A Survey", sifaka. cs. uiuc. edu 69 (2009): 70-71, (8 pgs).

(Continued)

*Primary Examiner* — Shiow-Jy Fan
(74) *Attorney, Agent, or Firm* — North Weber & Baugh LLP (57) ABSTRACT

Systems and methods are disclosed to identify entities that have a similar meaning, and may, in embodiments, be grouped into entity groups for knowledge base construction. In embodiments, the entity relations of similarity or non-similarity for an entity pair are predicted as a binary relationship. In embodiments, the prediction may be based upon similarity score between the entities and the entity features, which features are constructed using an entity feature or representation model. In embodiments, the prediction may be an iterative process involving minimum human checking and existing knowledge update. In embodiments, one or more entity groups are formed using graph search from the predicted entity pairs. In embodiments, a group centroid entity may be selected to represent each group based on one or more factors, such as its generality or popularity.

20 Claims, 4 Drawing Sheets

(56) References Cited

U.S. PATENT DOCUMENTS

| | | | |
|---|---|---|---|
| 2014/0172754 A1* | 6/2014 | He | G06N 5/02 706/12 |
| 2015/0081654 A1* | 3/2015 | Spangler | G06F 17/30646 707/706 |
| 2015/0213119 A1* | 7/2015 | Agarwal | G06Q 10/10 707/737 |
| 2015/0363509 A1* | 12/2015 | Maghoul | G06F 17/30864 707/722 |
| 2016/0004667 A1* | 1/2016 | Chakerian | G06F 17/212 715/277 |
| 2016/0148077 A1* | 5/2016 | Cox | G06K 9/00288 382/159 |
| 2016/0275177 A1* | 9/2016 | Yin | G06F 17/30613 |

OTHER PUBLICATIONS

Mikolov et al., "Distributed Representations of Words and Phrases and their Compositionality", Advances in neural information processing systems, 2013, (9 pgs).

Srikumar et al., "Learning Distributed Representations for Structured Output Prediction", Advances in Neural Information Processing Systems, 2014, (9 pgs).

Ristad et al., "Learning String-Edit Distance", Pattern Analysis and Machine Intelligence, IEEE Transactions on 20.5 (1998): 522-532, (11 pgs).

Cohen et al., "A Comparison of String Distance Metrics for Name-Matching Tasks", IIWeb. vol. 2003. 2003, (6 pgs).

Suykens et al.,"Least Squares Support Vector Machine Classifiers" Neural processing letters 9.3 (1999): 293-300, (8 pgs).

Ho, "Random decision forests" Document Analysis and Recognition, 1995., Proceedings of the Third International Conference on. vol. 1. IEEE, 1995, (5 pgs).

MacQueen, "Some Methods for Classification and Analysis of Multivariate Observations", Proceedings of the fifth Berkeley symposium on mathematical statistics and probability,vol. 1. No. 14. 1967, (17pgs).

Von Luxburg, "A Tutorial on Spectral Clustering", Statistics and computing 17.4 (2007): 395-416, (32 pgs).

* cited by examiner

SYSTEMS AND METHODS FOR HOMOGENEOUS ENTITY GROUPING

A. TECHNICAL FIELD

The present disclosure relates generally to identifying similar entities, and more specifically to systems and methods for homogeneous entity grouping.

B. BACKGROUND

Knowledge base is used in various applications, such as reasoning search engines, question answering in automatic medical diagnostics, etc. Knowledge base, which defines a plurality of entities and relationships among the entities. Entity grouping is an important step for knowledge base construction.

As observed, for each common entity, users have multiple different sayings which are aliases or synonyms of each other. Especially, in character based languages, such as Chinese and Korean, it is not uncommon that there may be more than 50 different sayings for one medical symptom (entity). These various sayings of a symptom should be grouped together and represented as a unique entity in the medical knowledge base.

Various efforts have been done for entity grouping. Entity tags, such as identifications, have been used for entity grouping. The entities may be expanded with corresponding variants to form an annotated entity for entity grouping. Entities may also be grouped together in a hierarchical fashion. Entity grouping methods are still to be explored in a natural setting with dynamically updated knowledge.

Therefore, there is a need for systems and methods to group entities with improved grouping performance for processes such as knowledge base construction.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

Figure 1:
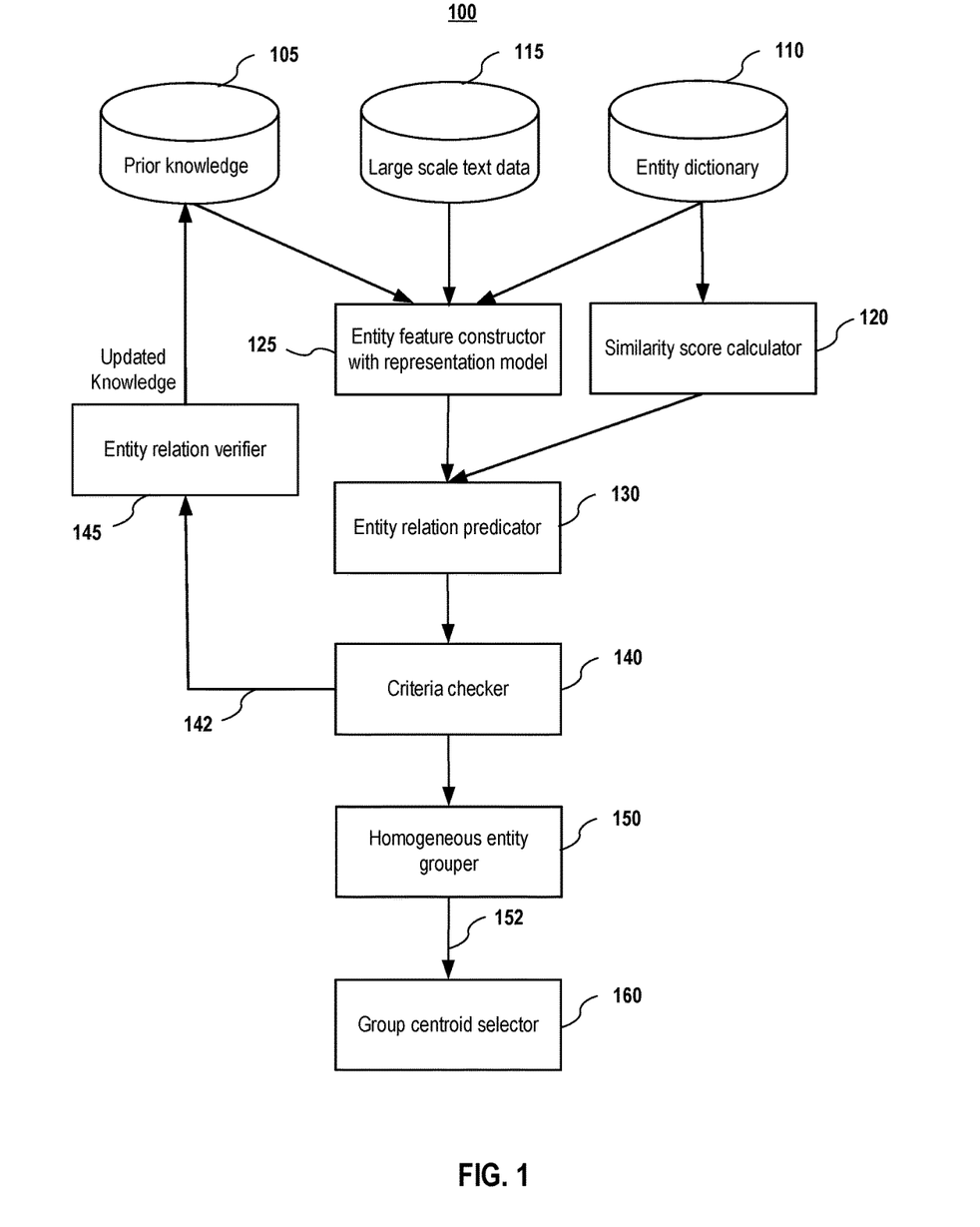
FIG. 1 shows system architecture of a homogeneous entity grouping system according to embodiments of the present disclosure.

FIG. 1 shows system architecture 100 of a homogeneous entity grouping system according to embodiments of the present disclosure. In embodiments, the homogeneous entity grouping system 100 comprises an entity feature constructor 120, an entity relation predictor 130, a criteria checker 140, a homogeneous entity grouper 150, and an entity group centroid selector 160. The entity dictionary 110 comprises a set of terms which to be determined whether they have similar meaning. The large scale text data source 110 may be extracted from online medical forum data, such as posts, statements, messages from forum users. For example, in Baidu "Knows" question/answering platform, there are many medical questions posted on a daily basis. Those questions may contain lots of text information.

The entity feature constructor 125 couples to a prior knowledge dataset 105, a large scale text data 115, and an entity dictionary 110 to construct features for entities based on the prior knowledge, the large scale text data, and the entity dictionary. In some embodiments, the homogeneous entity grouping system 100 also comprises a similarity score calculator 120, which receives at least one similar entity pair from the entity dictionary 110 and outputs a similarity score between entities of each similar entity pair. The entity relation predictor 130 receives the features for entities and similarity scores between entities of each similar entity pair to predict whether the entities of each entity pair are real synonymous entities. In some embodiments, the entity feature constructor 125 comprises an entity representation model to convert or map each entity into a vector. The entity relation predictor 130 then makes entity relation predictions based on the mapped vectors and the similarity scores between entities.

In some embodiments, the homogeneous entity grouping system 100 also comprises a criteria checker 140 to verify whether one or more criteria are met. In some embodiments, the prediction is an iterative and semi-supervised prediction process. The one or more criteria may be based on number of iteration and/or iterative prediction changes. If the one or more criteria are not met, some entity relation predictions within all output entity relation predictions are sampled for entity relation verification by an entity relation verifier 145. The entity relation verification may be implemented via human verification. The verification results are fed back as updated knowledge into the prior knowledge 105 for prior knowledge update. The verification results may be a correction of the predicted relations of the entities of the sampled entity relation predictions. For example, the correction may be a change of the positive relation prediction entity relation to a negative relation. The correction may also be a change of the negative relation prediction entity relation to a positive relation.

In following iterations, the entity feature constructor 125 re-construct entity features for entities based on the updated prior knowledge, the large scale text data, and the entity dictionary. Similarly, the entity relation predictor 130 re-predicts entity relations based at lease on the re-constructed entity features.

If the one or more criteria are met, e.g. the different between the prediction of latest updated similar entity pairs and the prediction of previously updated similar entity pairs is smaller than a threshold after multiple rounds of iteration processes, the predicted entity relations of the latest iteration are output to an entity grouper 150 for generation of one or more entity groups 152. After one or more groups formed, a group centroid is selected by an entity group centroid selector 160 for each entity group. Various algorithms may be implemented for the selection of centroid with some selection methods disclosed in FIG. 3. Eventually, the entity group centroid selector 160 outputs one or more homogeneous entity groups with an entity group centroid for each group.

Figure 2:
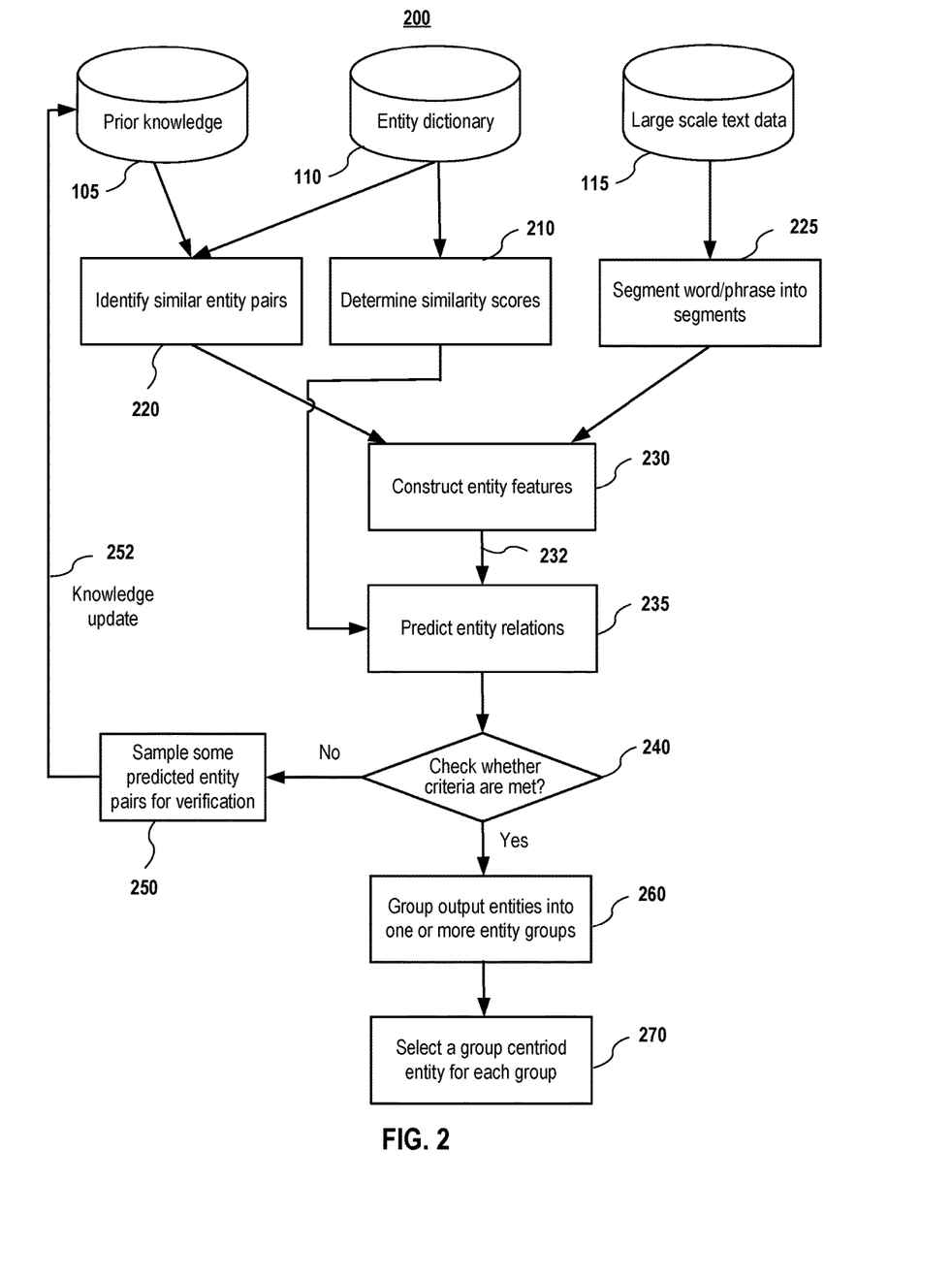
FIG. 2 illustrates an exemplary flow diagram for homogeneous entity grouping according to embodiments of the present disclosure.

FIG. 2 illustrates an exemplary flow diagram for homogeneous entity grouping according to embodiments of the present disclosure. In step 210, a similarity score is determined between any two entities within the entity dictionary 110. A similarity score is used to quantitatively describe relations between entities of an entity pair. In embodiments, the similarity score is a string level similarity s(e1, e2) obtained from entity string matching, wherein e1 and e2 are exemplary identifies similar entities within one similar entity pair. In some embodiments, the similarity score is based on similarity in edited distance or Jaro-Winkler Distance of the string sequence. For example, when for one similar entity pairs <e1, e2>, a first entity e1 has a string of ABC and a second entity e2 has a string of ABD, the string level similarity score s(e1, e2) will be 1.

In step 220, the prior knowledge (or existing knowledge base) 105 and the entity dictionary 110 are used to identify similar entity pairs among all possible entity pairs within the entity dictionary 110. Knowledge of synonymous or related entities according to the prior knowledge 105 is used to guide the identification of similar entity pairs within the entity dictionary 110. In embodiments, one entity may be included in one or more entity pairs, since it may potentially be related to more than one other entity.

In step 225, long sentences in the large scale text data 215 are truncated to provide a plurality of word/phrase segmentations. The word/phrase segmentations are used as an input, besides the identified similar entity pairs, to a representation model for construction of entity features in vectors. The identified similar entity pairs may also be used as constraints to guide the features construction.

In step 230, all entities are mapped into vectors in an entity representation model via word embedding techniques, based on word/phrase segmentations produced in step 225. In some embodiments, the identified similar entity pairs are used as constraints in the word embedding for improving embedding accuracy. In some embodiments, the entity representation model is trained multiple times, during each iteration of an iterative entity relation prediction process.

In step 235, a prediction of whether the entities should be grouped together as entity groups is made based on the entity vectors 232 and the similarity scores between entities of each entity pair. Various approaches may be used in entity relation prediction. In embodiments, the entity relations are predicted using a classification approach as a binary relationship as "the entities should be grouped together or related to each other" (corresponding to a positive relation prediction) or "the entities should not be grouped together or not related to each other" (corresponding to a non-positive relation prediction). In some embodiments, a mathematic formula $f$ is used for the prediction with $f$ being function $f(v1, v2, s(e1, e2))$ of the vector pair and the similarity score. If the $f(v1, v2, s(e1, e2))$ returns 1, the similar entity pair is predicted as "should be grouped together". If the $f(v1, v2, s(e1, e2))$ returns 0, the similar entity pair is predicted as "should not be grouped together". In some embodiments, a clustering approach is implemented for entity relation prediction. Under clustering approach, the entities are grouped directly by clustering methods (unsupervised) based on features. In one embodiment, k-means based on vector features may be used. In another embodiment, both vector features and similarity scores may be utilized to build a similarity graph among entities and use graph clustering.

In embodiments, various machine leaning methods may be used for the entity relation prediction. The machine learning for the classification approach may be supervised learning, such as support vector machine (SVM) and random decision forests, using existing medical knowledge as label data. The machine learning for the clustering approach may be unsupervised learning, such as k-means and spectral density based graph clustering.

In step 240, the predicted entity relations under the classification approach or clustering approach are checked whether one or more criteria are met. The one or more criteria may comprise iteration number requirement and/or iterative prediction change requirement. In some embodiments, the iteration number requirement requires that the prediction iteration number should be larger than 1. Under such requirement, after initial prediction, the homogeneous entity grouping process goes to step 250 for additional iterations, which is described below. In some embodiments, the iterative prediction change requirement requires that difference the entity predictions of current iteration and the entity predictions of previous iteration is smaller than a threshold value. For example, the difference should be less than a certain percentage among all predicted entities.

In step 250, some prediction results from predicted similar entity pairs are sampled for verification. The sampling may be a random process with the sampling of each iteration independent from each other. In some embodiments, the entities being sampled may be excluded from being sampled again in following iterations. The verification process may be implemented using human checking or other checking methods. The verification results may be a correction of the predicted relations of the entities of the sampled entity relation predictions based on ground truth. In embodiments, the correction may be a change of the positive relation prediction entity relation to a negative relation. The correction may also be a change of the negative relation prediction entity relation to a positive relation.

The verification results may be used as knowledge update 252 to update the prior knowledge 105. After the update of the prior knowledge 105, similar entity pairs are re-identified as in step 220 based at least on the updated prior knowledge. Step 230 and 235 are also repeated accordingly. The re-identified similar entity pairs are then used for re-predicting entity relations, which are compared with previously predicted entity relations in step 240. If the change from the comparison is still significant (e.g. the difference between the latest predicted relations and the previously predicted relations more than a threshold value), the flow process goes into step 250 again and back to 220 for additional iterations, as described above. Some predicted entity pairs are sampled again for verification on step 250. The results of the further verification are used as knowledge update 252 to update the prior knowledge and for more iterative entity relations prediction, as disclosed above. The further verification process may be done using human checking or other checking methods. In embodiments, the randomly selected entity pairs account for a small portion of the predicted entity pairs.

If the change is not significant (e.g. the difference between the latest predicted relations and the previously predicted relations less than a threshold value), entity pairs with positive relations in the current iteration are output as output entity pairs, which are then used in step 260 for entity grouping.

In some embodiments, when the clustering approach (unsupervised) is implemented for entity relation prediction, the entities are grouped directly. In step 250, some entity pairs are sampled based on clustering results. For example, a positive candidate entity pair can be extracted from one predicted group and a negative entity pair can be extracted across two predicted groups.

In step 260, the output entity pairs are grouped into one or more entity groups. Various methods may be implemented for the grouping. In embodiments for classification approach, the entity groups are formed using graph search among all the output entity pairs. During the graph search, all output entity pairs are grouped into one or more clusters of connected entities, each cluster of connected entities being an entity group. In some embodiments, each group may comprise more than one entity pair. Eventually, each formed entity group comprises all entity pairs that have a positive entity relationship for all entities in the group. For clustering approach, the predicted results are in the form of groups already.

Figure 3:
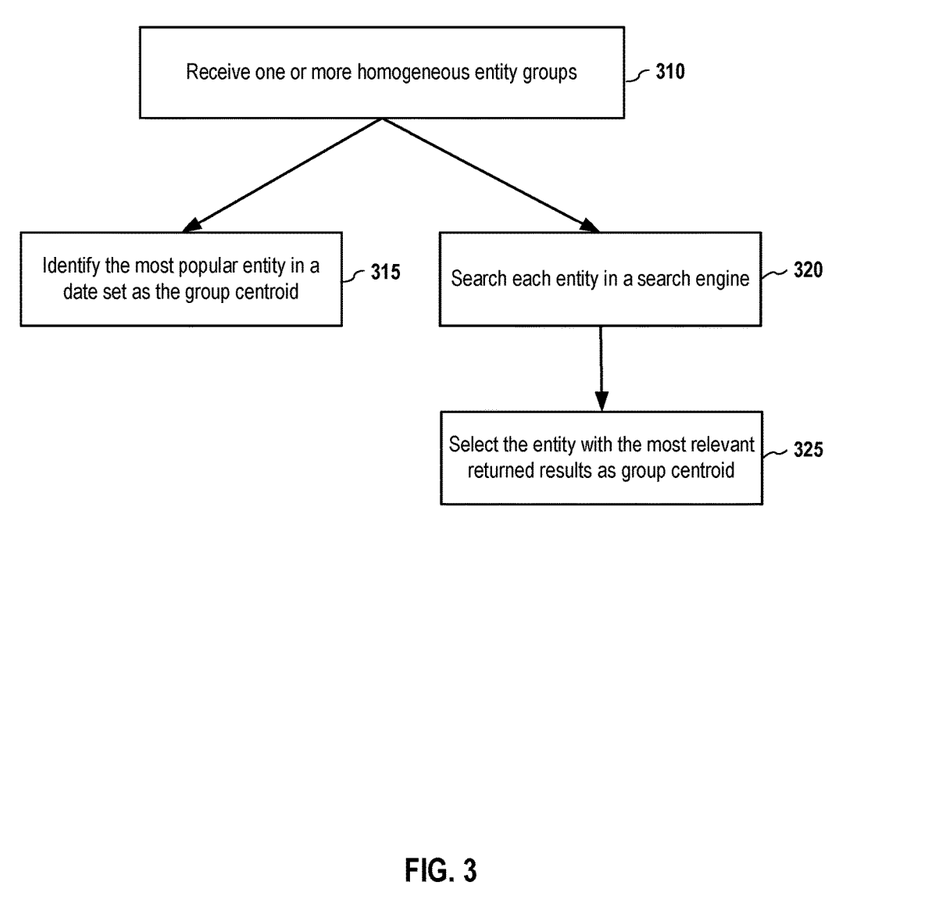
FIG. 3 illustrates an exemplary flow diagram for entity group centroid selection according to embodiments of the present disclosure.

In step 270, a group centroid is selected among the entities of each homogenous entity group, which is described in details in FIG. 3.

FIG. 3 illustrates an exemplary flow diagram for entity group centroid selection according to embodiments of the present disclosure. In step 310, one or more entity groups are received. The entity with the most popularity in a data set within the group is selected as a group centroid in step 315. The most popularity may be referred as the highest occurring frequency in the data set generating the entities group. In embodiments, the data set may be the large scale text data 115. Alternatively, each entity within the group of entities is searched in general search engines in step 320, such as Google, Bing or Baidu, and the entity with the most number of relevant returned results is selected as the group centroid in step 325.

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 4:
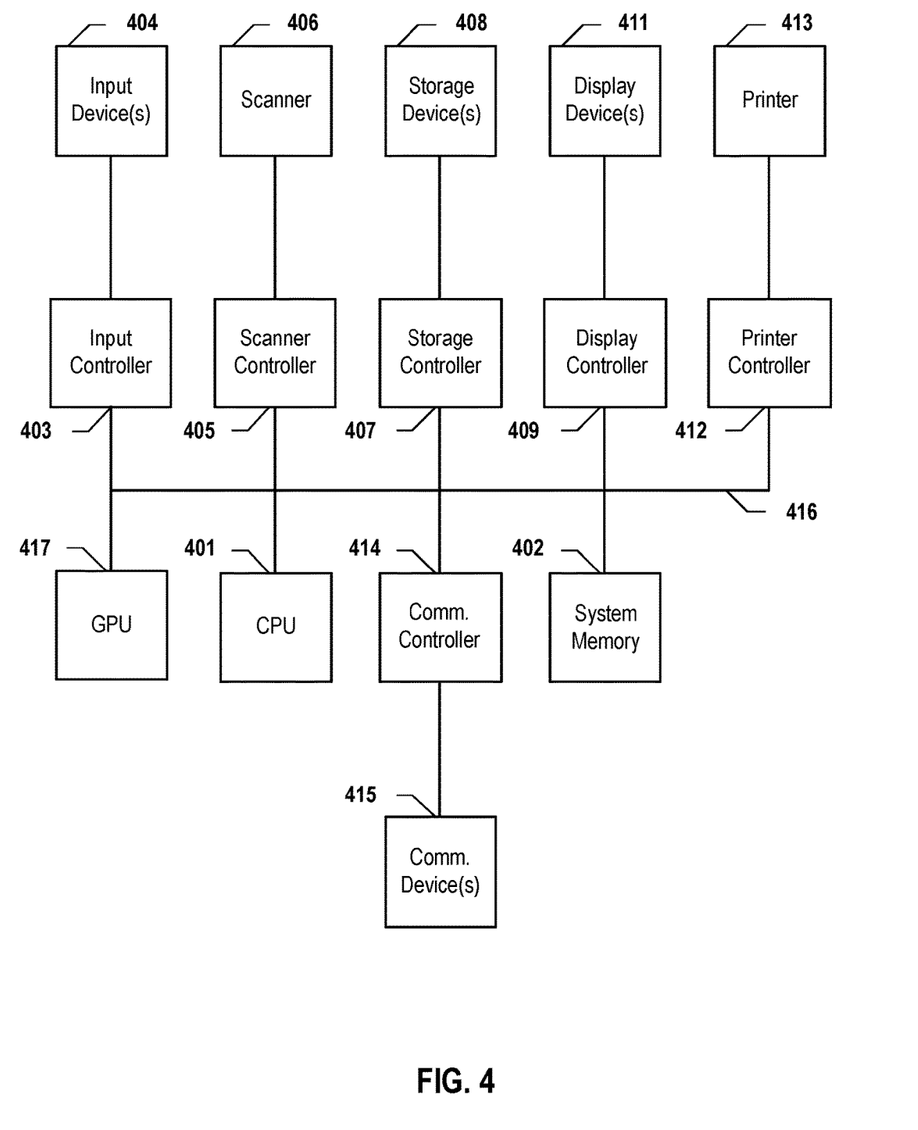
FIG. 4 depicts a simplified block diagram of a computing device/information handling system, in accordance with embodiments of the present disclosure.

FIG. 4 depicts a block diagram of a computing system 400 according to embodiments of the present invention. It will be understood that the functionalities shown for system 400 may operate to support various embodiments of a computing system—although it shall be understood that a computing system may be differently configured and include different components. As illustrated in FIG. 4, system 400 includes one or more central processing units (CPU) 401 that provides computing resources and controls the computer. CPU 401 may be implemented with a microprocessor or the like, and may also include one or more graphics processing units (GPU) 417 and/or a floating point coprocessor for mathematical computations. System 400 may also include a system memory 402, which may be in the form of random-access memory (RAM), read-only memory (ROM), or both.

A number of controllers and peripheral devices may also be provided, as shown in FIG. 4. An input controller 403 represents an interface to various input device(s) 404, such as a keyboard, mouse, or stylus. There may also be a scanner controller 405, which communicates with a scanner 406. System 400 may also include a storage controller 407 for interfacing with one or more storage devices 408 each of which includes a storage medium such as magnetic tape or disk, or an optical medium that might be used to record programs of instructions for operating systems, utilities, and applications, which may include embodiments of programs that implement various aspects of the present invention. Storage device(s) 408 may also be used to store processed data or data to be processed in accordance with the invention. System 400 may also include a display controller 409 for providing an interface to a display device 411, which may be a cathode ray tube (CRT), a thin film transistor (TFT) display, or other type of display. The computing system 400 may also include a printer controller 412 for communicating with a printer 413. A communications controller 414 may interface with one or more communication devices 415, which enables system 400 to connect to remote devices through any of a variety of networks including the Internet, an Ethernet cloud, a Fiber Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

It should be understood that various system components may or may not be in physical proximity to one another. For example, inputs and outputs may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

It shall be noted that elements of the claims, below, may be arranged differently including having multiple dependencies, configurations, and combinations. For example, in embodiments, the subject matter of various claims may be combined with other claims.

The invention claimed is:

1. A computer-implemented method to group synonymous entities from among a set of entities, based at least in part on their semantics, the method comprising:

for each entity pair from a set of entity pairs formed from the set of entities, determining a similarity score based upon character similarity between the entities that form the entity pair;

using a prior knowledge dataset to identify one or more sets of similar entities having same or similar meanings as indicated in the prior knowledge dataset, the one or more sets of similar entities comprising entities from an entity dictionary, the entity dictionary comprising the set of entities to be grouped relative to whether they have a same or similar meaning;

using large scale text data to construct embeddings of entities in the set of entities in which embedding training using the large scale text data is constrained using at least some of the sets of similar entities so that entities from a set of similar entities are represented by a same or similar embedding;

for each entity pair from the set of entity pairs, predicting entity relations between the entities that form the entity pair using as a feature set the entity embeddings of the entities that form the entity pair and the similarity score for that entity pair, the prediction being a binary prediction of positive relation of similarity or non-positive relation of similarity;

responsive to one or more criteria not being met:
sampling a set of predicted entity relations for verification;
using verification results to update the prior knowledge dataset; and
returning to the step of using the prior knowledge dataset to identify one or more sets of similar entities having same or similar meanings to re-identify sets of similar entities, re-construct the embeddings of the entities using the re-identified sets of similar entities as constraints to the embedding training, and re-predict entity relations;

responsive to one or more criteria being met, outputting the entity pairs with positive relation predictions; and using the positive relation predictions to group the entities from the set of entities into one or more entity groups, each entity group comprising entities that have a positive entity relationship linking the entities in the entity group to have a same or similar meaning.

2. The method of claim 1 wherein the one or more criteria comprise an iteration number requirement and an iterative prediction change requirement.

3. The method of claim 2 wherein the iteration number requirement requires more than one iteration, the iterative prediction change requirement requires the difference between entity relation predictions under current iteration and previous iteration is less than a threshold value.

4. The method of claim 1 wherein the step of predicting entity relations between the entities that form the entity pair using the entity embeddings of the entities and the similarity score for that entity pair is performed using a supervised learning predictor or unsupervised learning predictor.

5. The method of claim 1 wherein the verification for the sampled predicted entity relations is done by human checking.

6. The method of claim 1 further comprising:
selecting an entity that is a member of an entity group as a group centroid for the entity group.

7. The method of claim 6 wherein the entity that is selected as the group centroid is selected based upon being a most popular entity in a dataset among the entities that form that entity group.

8. The method of claim 6 wherein the one or more entity groups are grouped using graph search.

9. A computer-implemented method for identifying similar entities, the method comprising:

[a] constructing entity features, using an entity feature constructor, for each entity of a plurality of entities using large scale text data and based on prior knowledge, which identifies at least some of the entities from the plurality of entities as having a same or similar meaning, the entity feature constructor using at least some of the entities that have been identified as having a same or similar meaning to constrain entity feature construction so that entities that have been identified as having a same or similar meaning are represented by same or similar entity features;

[b] for each entity pair from a set of entity pairs formed from entities from the plurality of entities, predicting, using an entity relation predictor and at least entity features for two entities of the entity pair, an entity relation regarding whether the two entities that form the entity pair share a similar meaning;

[c] randomly sampling some entity pairs for entity relations verification and verifying if the entity relation for each randomly sampled entity pair is correct;

[d] using the verified entity relations to update the prior knowledge;

[e] re-constructing at least some of the entity features using the updated prior knowledge of entities that have been identified as having a same or similar meaning to constrain entity feature construction so that entities that have been identified as having a same or similar meaning are represented by same or similar entity features;

[f] re-predicting at least some of the entity relations using the re-constructed entity features;

[g] iterating steps [d], [e], and [f] until a difference in an entity relations change measure between an evaluation set of entity pairs and their corresponding entity relations for a current iteration and their corresponding entity relations from a prior iteration is less than a threshold; and

[h] outputting each entity pair that has an entity relation that indicates that the entities in the entity pair have a same or similar meaning.

10. The method of claim 9 further comprising:
[i] forming one or more entity groups from the outputted entity pairs, each entity group comprising entities in the group that have an entity relation that indicates that the entities have a similar meaning; and
[j] selecting, using a group centroid selector, a representation entity as a group centroid for each entity group.

11. The method of claim 10 wherein the entity relation prediction for whether two entities share same meaning is based on mapped vectors of the two entities and a similarity score between the two entities.

12. The method of claim 11 wherein the similarity score between the two entities is determined from a string level similarity between the two entities.

13. The method of claim 9 wherein the step of verifying is performed by human verification.

14. The method of claim 9 wherein the entity pairs are grouped using graph searching to separate the entities into at least one cluster of connected entities, each cluster of connected entities being an entity group.

15. The method of claim 9 wherein the group centroid is selected as the most popular entity in a data set among the plurality of entities with the group.

16. The method of claim 9 wherein the one or more entity groups are grouped using graph search.

17. A non-transitory computer-readable medium or media comprising one or more sequences of instructions which, when executed by one or more processors, causes the steps to be performed comprising:
- identifying, using an existing knowledge dataset, one or more sets of similar entities, in which a set of similar entities comprises entities from an entity dictionary that have a same or similar meaning as indicated by the existing knowledge dataset;
- for each entity pair from a set of entity pairs formed from entities in the entity dictionary, determining a similarity score based upon character similarity between the entities that form the entity pair;
- for each entity in the entity dictionary, constructing an embedding using at least some of the one or more sets of similar entities as construction constraints to have entities in a set of similar entities represented with a same or similar embedding;
- for each entity pair from the set of entity pairs formed from entities in the entity dictionary, predicting the entity relations between the two entities of the entity pair based on at least the embeddings of the two entities and the similarity score of the entity pair, the prediction being a prediction of whether the two entities of the entity pair are a related entity pair or not related entity pair;
- outputting related entity pairs after the prediction;
- grouping the related entity pairs as one or more entity groups, each entity group comprising entities in the group that are all related; and
- selecting a group representative for each entity group.

18. The non-transitory computer-readable medium or media of claim 17 whether the prediction the entity relation is implemented using a supervised classification approach or an unsupervised clustering approach.

19. The non-transitory computer-readable medium or media of claim 18 wherein the prediction the entity relation under the supervised classification approach or an unsupervised clustering approach is an iterative process.

20. The non-transitory computer-readable medium or media of claim 19 wherein in the iterative process, some predicted entity relations are randomly sampled in each iteration for verification, the verified results are used for re-predicting entity relations until one or more criteria have been met.

* * * * *